United States Patent [19]

Loveless

[11] 4,026,325
[45] May 31, 1977

[54] MINIATURE FOUR-WAY VALVE

[75] Inventor: Stanley M. Loveless, Kalamazoo, Mich.

[73] Assignee: General Gas Light Company, Kalamazoo, Mich.

[22] Filed: Mar. 1, 1976

[21] Appl. No.: 662,535

[52] U.S. Cl. .................. 137/625.26; 137/625.69
[51] Int. Cl.² ........................................ F16K 11/02
[58] Field of Search ............... 137/625.26, 625.69, 137/625.65, 625.27, 625.25

[56] References Cited

UNITED STATES PATENTS

| | | | |
|---|---|---|---|
| 2,920,650 | 1/1960 | Moog, Jr. | 137/625.69 |
| 2,997,065 | 8/1961 | Johnson | 137/625.69 |
| 3,195,574 | 7/1965 | Carls | 137/625.69 |
| 3,234,968 | 2/1966 | Frantz | 137/625.26 X |
| 3,418,002 | 12/1968 | Hennells | 137/625.69 X |
| 3,550,631 | 12/1970 | Van der Laan | 137/625.65 |
| 3,794,075 | 2/1974 | Stoll et al. | 137/625.27 X |

*Primary Examiner*—Alan Cohan
*Attorney, Agent, or Firm*—Woodhams, Blanchard and Flynn

[57] ABSTRACT

A miniature four-way valve, particularly for the control of a pressurized gas, such as air, constructed and arranged so that it can be made in small sizes without excessive expense while being reliable, sturdy and resistive to damage. The valve includes a housing having ports formed therein which accommodate conventional conduits of rather large size, which ports communicate with a central passage containing therein a slidable valve plunger of extremely small size. The inlet port communicates with a chamber disposed in surrounding relationship to the valve plunger, which chamber is defined between a pair of opposed tapered walls having a concave configuration. These walls function as valve seats and coact with a resilient seal ring secured to the valve plunger for creating a sealing engagement similar to a poppet valve. The shifting movement of the plunger, which causes the seal ring to be shifted into sealed engagement with one of the opposed tapered walls, controls the flow of fluid from the inlet port to one of two load ports, and similarly controls the flow of fluid from the two load ports to respective exhaust ports.

18 Claims, 3 Drawing Figures

U.S. Patent
May 31, 1977
4,026,325
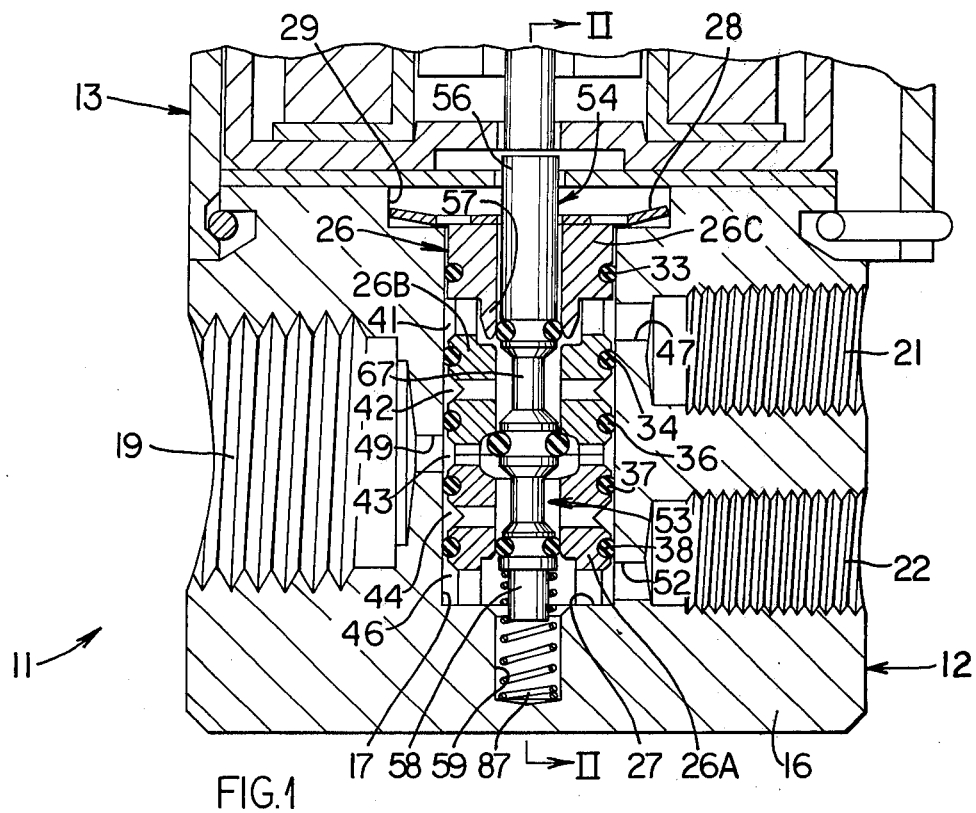
FIG.1
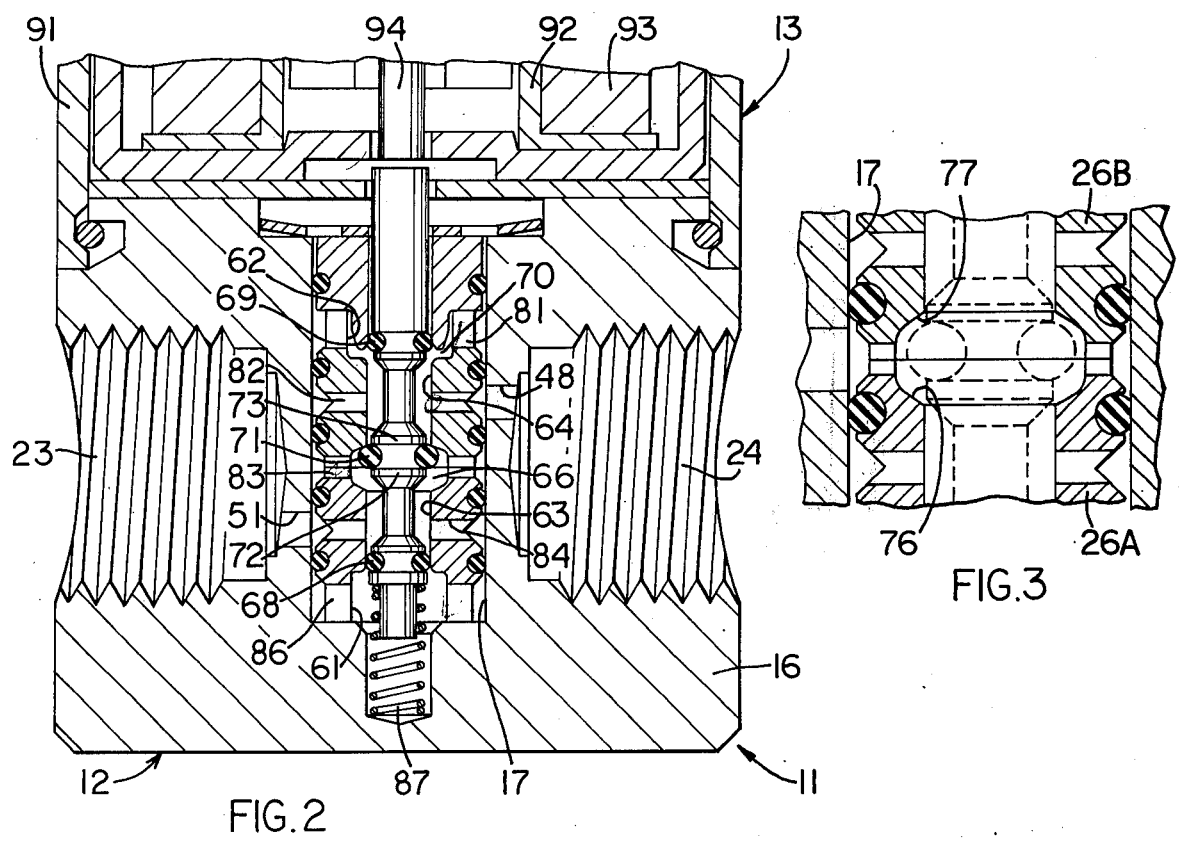
FIG.2
FIG.3

4,026,325

MINIATURE FOUR-WAY VALVE

FIELD OF THE INVENTION

This invention relates to an improved four-way valve for controlling the flow of a pressurized gas, usually air, and particularly a valve adapted for manufacture in very small sizes without sacrificing reliability, simplicity or economy of manufacture and maintenance.

BACKGROUND OF THE INVENTION

In general, the art involving valves for handling pressurized gases is highly developed and a large number of designs have been known for many years and have long been in successful operation. Many competing designs are available in the marketplace and such designs have been successfully modified for application to a wide variety of specific uses. This art has, however, developed primarily in connection with relatively large valves, such as valves adapted for connection to conduits of at least about ¼ inch internal diameter (⅛ NPT pipe) and arranged for supplying, for example, air cylinders of 1 inch in diameter and having a stroke of up to 8 inches.

However, in addition to the foregoing, there has over the past several years been developing a series of applications for electrically operated valves for controlling a pressurized gas, which valves are extremely small and are adapted for supplying a very small load, such as an air cylinder of three-eighths to one-half inch in diameter and having a stroke of up to 3 inches. Inasmuch as the cylinder to be so supplied is very small, the valve by which it is to be supplied should be correspondingly small. Nevertheless, for reasons of uniformity in design, convenient commercial availability of pipe, resistance to physical damage, and to minimize pressure drop from one end of a conduit to another, the line through which such valve and cylinder is supplied should be as large as possible and in many case seldom less than ⅛ NPT pipe (0.265 inch internal diameter and 0.406 inch external diameter).

While many valves have been offered to the market over the past several years for meeting these conditions, and some of them have been accepted and used, the valves previously available have at best been only partially satisfactory. Specifically, they have in general been reasonably successful in operation but they have been based on the designs of larger valves and when made in small sizes have often produced extremely awkward and consequently expensive manufacture and assembly problems and further they have often not been well adapted to accepting conduit in the minimum size above indicated. This can be readily understood when it is appreciated that the valves through which this art has primarily developed, such as a valve which has been offered to the industry for a substantial period of time under U.S. Pat. Nos. 3,251,378 or 2,912,009, wherein said valves are of the order of 4⅝ inches long by 1⅝ inches in diameter including the valve portion, create serious design problems when same are reduced to a size approximately 1⅛ inches in diameter or 1⅛ inches square, and 2 7/16 inches in length.

One particularly difficult problem in the provision of valves of small sizes, related to but separate from the foregoing, is the problem of manufacturing tolerances in that tolerances which can be accepted and which present no great difficulty in the manufacture, assembly or operation of a relatively large valve have a serious and often adverse effect on the assembly and operation of a very small valve. On the other hand, to reduce the manufacturing tolerances materially will excessively increase the cost of the manufacturing operation. It is therefore necessary to arrange a small valve in such a manner that normal manufacturing tolerances can be accepted, and the variations resulting therefrom absorbed, without creating assembly or operating problems.

A further problem involved in the design of such small valves as aforesaid, especially small four-way valves, arises out of the fact that it is for some uses desirable to provide in valves of physically small size the operating characteristics of the larger valve. For example, in providing control panels for the manufacture of small articles such as semi-conductors or watches, the processing machine though complex is relatively small and hence it is undesirable to have the large control system which would be required by the use of large valves. Thus, a substantial need exists and has existed for a long time for very small four-way valves with a capacity and capability for use with pipe sizes characteristic of large valves but which are themselves of much smaller size than previously considered necessary.

Still a further problem with such small valves, especially four-way valves, stems from the desire to use such valves in combination with an electrical operator, specifically a solenoid. The known four-way valves, even those believed to be of small size, have necessarily utilized a valve stroke of substantial length. Since the valve stroke must be provided by the solenoid, and inasmuch as the power requirements of the solenoid, and hence the size, increases in proportion to the square of the stroke, this necessarily requires a solenoid of substantial size so that same is unacceptable for use in situations requiring a miniature valve and operator.

Another problem encountered has been the increased turbulence of the air flowing through the valve from the inlet port to the load ports. This increased turbulence has prevented the successful design of a truly miniature four-way valve in that it has prevented the valve from operating in the desired manner.

Accordingly, the objects of the invention include:

1. To provide a four-way valve for controlling the flow of a pressurized gas, which valve will be efficient and reliable and can be economically produced in very small sizes.

2. To provide a four-way valve, as aforesaid, which when produced in the very small sizes indicated will still be sturdy and reliable over a long period of time of high-speed repetitive operation.

3. To provide a four-way valve, as aforesaid, of construction which, even though made in the very small sizes aforesaid, will still permit the use of conventional tolerances so as to be economical to manufacture, while still being efficient in operation, 4. To provide a four-way valve, as aforesaid, which in spite of its very small size can be efficiently associated with conduits of sizes normally used for larger valves.

5. To provide a four-way valve, as aforesaid, which in spite of its very small size will have the performance characteristics, including capacity, or previously known larger valves.

6. To provide a valve, as aforesaid, which has an extremely small valve stroke so that it can be actuated by an electrical operator, particularly a solenoid, of extremely small size and power.

7. To provide a valve, as aforesaid, which utilizes a liner positioned in surrounding relationship to a slidable valve plunger and constructed from two identical sleevelike members disposed in end-to-end relationship, said two members cooperating to define an intermediate flow control having opposed tapered surfaces which function as valve seats and coact with a resilient seal ring on the plunger for controlling flow from the inlet port.

8. To provide a valve, as aforesaid, wherein the opposed tapered valve seats extend at a steep angle relative to the direction of movement of the valve plunger and confine the resilient seal ring therebetween for limiting the stroke of the plunger while permitting the stroke to be extremely small.

9. To provide a valve, as aforesaid, wherein the tapered valve seats are preferably provided with a curved or concave configuration to thereby increase the clearance around the resilient seal ring, which clearance is believed to minimize turbulence as the air flows past the seal ring from the inlet port to the selected load port.

Other objects and purposes of the invention will be apparent upon examination of the accompanying drawings and study of the following specification.

BRIEF DESCRIPTION OF THE DRAWINGS

FIG. 1 is a central sectional view of a valve embodying the invention.

FIG. 2 is a sectional view taken on line II—II of FIG. 1.

FIG. 3 is an enlarged, fragmentary sectional view of a position of the valve assembly.

Certain terminology will be used in the following description for convenience in reference only and will not be limiting. For example, the words, "upwardly", "downwardly", "rightwardly" and "leftwardly" will refer to directions in the drawings to which reference is made. The words "inwardly" and "outwardly" will refer to directions toward and away from, respectively, the geometric center of the valve and designated parts thereof. Said terminology will include the words above-mentioned, derivatives thereof and words of similar import.

SUMMARY OF THE INVENTION

The present invention relates to a four-way valve wherein a housing has a central opening which communicates with a plurality of flow control ports. The central opening contains a sleevelike liner which is sealingly supported on a plurality of seal rings which isolate the ports from one another. A slidable valve plunger is supported within the liner and has seal rings thereon which coact with the liner for controlling the flow of fluids between the individual ports. The liner, which in a preferred embodiment includes a pair of identical sleeves disposed in end-to-end relationship, has an interior enlargement therein defined between a pair of opposed tapered surfaces which are of concave configuration and act as valve seats. This enlargement communicates with the inlet port and also accommodates therein a resilient seal ring seated on the plunger so that axial shifting of the plunger causes the seal ring to selectively engage one of the tapered surfaces for controlling fluid flow from the inlet port.

DETAILED DESCRIPTION

Referring to the drawing, there is illustrated therein one embodiment of a valve assembly 11 according to the present invention, which valve assembly includes a valve portion 12 associated with an electrical operating portion 13. While the valve portion and operating portion are made for close cooperation with each other, nevertheless it will be appreciated that the valve portion will itself operate effectively with other types of operating portions, including mechanical and pneumatic operators.

Considering now the valve portion 12, there is provided a substantially cylindrical housing 16 having a central opening 17 therein and a plurality, here five, of laterally extending ports 19, 21, 22, 23 and 24. The central opening 17 accommodates therein an elongated sleevelike liner 26 which, in a preferred embodiment, is formed from two identical liner sections 26A and 26B disposed in opposed end-to-end relationship, together with an end liner section 26C. The lower end of liner section 26A is engaged with a shoulder 27 which is formed on the housing at the lower end of central opening 17. The upper end of liner section 26C engages a conventional spring clip 28 which is retained within the enlarged upper end of portion 29 of the central opening 17.

The liner 26 has a plurality of elastomeric O-rings 33, 34, 36, 37 and 38 mounted in surrounding relationship thereto, which O-rings are disposed in sealing engagement with the wall of the central opening 17. The liner 26 is of substantially smaller diameter than the central opening 17 so as to result in an annular space therebetween, which annular space is divided by the above-mentioned O-rings into a plurality of separate ringlike chambers 41, 42, 43, 44 and 46. The chambers 41, 42, 43, 44 and 46 respectively communicate with radial openings 47, 48, 49, 51 and 52, which openings in turn respectively communicate with the ports 21, 24, 19, 23 and 22.

An elongated central opening means 53 extends through the liner 26 and slidably supports therein an elongated valve plunger 54. The upper end of valve plunger 54 has an enlarged cylindrical portion 56 which is slidably guided within the upper part of the central opening means 53 as defined by the upper liner section 26C. The lower end of the plunger has a similar, but smaller diameter, cylindrical portion 58 slidably accommodated within a guide opening 59 which constitutes an extension of the central opening means 53 and is coaxially aligned therewith.

The opposite ends of the liner sections 26A and 26B, respectively, have enlarged openings 61 and 62 adjacent the opposite free ends thereof. The openings 61 and 62, respectively, communicate with reduced diameter intermediate openings 63 and 64, the latter openings being a part of the central opening means 53. The intermediate openings 63 and 64 in turn define therebetween an enlarged center opening or chamber 66. The valve plunger 54, which extends through the liner openings means 53, includes an elongated rod portion 67 extending between the guide portions 56 and 58. The rod portion 67 has a pair of spaced elastomeric O-rings 68 and 69 mounted thereon, such as by being accommodated within annular grooves. The O-ring 68 is adapted to sealingly engage the wall of the opening 63 to control the communication between openings 61 and 63. In a similar manner, seal ring 69 is adapted to sealingly engage the walls of openings 64 and 57. The seal ring 69 is adapted to axially move across an annular groove 70 which is formed between the adjacent ends of linear sections 26B and 26C so as to permit communication between openings 62 and 64. The engagement of seal ring 69 with linear section 26C seals the exhaust and prevents air from escaping into the electrical operator 13.

The valve plunger 54 has still a further elastomeric seal ring 71 mounted in surrounding relationship thereto, which seal ring 71 is disposed centrally between the seal rings 68 and 69 and is of substantially larger cross-section. The seal ring 71 is disposed in an annular groove formed within a cylindrical enlargement which includes enlarged cylindrical guide portions 72 and 73 positioned axially on opposite sides of the seal ring 71 and disposed so as to be closely but slidably confined by the adjacent intermediate openings 63 and 64. The seal ring 71 is positioned within the large center opening or chamber 66 and has an exterior diameter which is substantially larger than the diameters of the adjacent openings 63 and 64. The seal ring 71 is thus confined for movement solely within the enlarged center chamber 66, which chamber is defined between opposed sloped conical walls 76 and 77. These walls are inclined in opposite directions and act as valve seats, whereby the seal ring 71 can be selectively moved into sealing engagement with one of the walls 76 or 77 in the manner of a poppet valve. The seal ring 71 thus controls the flow from the center chamber 66 into the adjacent intermediate openings 63 and 64.

The walls 76 and 77 extend at a steep angle relative to the longitudinal axis of the valve plunger and are each preferably of a concave configuration, when viewed in a radially outwardly extending direction, whereby the seal ring 71 engages the wall 76 or 77 at a contact point which is closely adjacent the corner formed between the surface 76 or 77 and the adjacent cylindrical wall defined by the intermediate opening 63 or 64. However, this corner is slightly chamfered to minimize the sharpness thereof. A line drawn tangent to the concave surface adjacent this corner intersects the longitudinal axis of the valve plunger at an angle of approximately 60°. The steeply angled, concave walls 76 and 77 result in the contact point with the seal ring 71 being positioned radially inwardly as close to the axis of the valve plunger as possible, whereby the fluid pressure which acts on the seal ring 71 and hence on the valve plunger assembly thus acts over an area of minimum diameter. Further, this relationship between the seal ring 71 and the concave configuration of the valve seats 76 and 77 also tends to mimimize the wedging of the seal ring against the valve seat, which wedging constitutes a more serious problem when conventional flat valve seats of a 45° angle are utilized. These factors thus reduce the force required to shift the valve plunger, so that a smaller external force (either spring or solenoid force) can be utilized to control shifting. These factors also result in substantially less distortion of the seal ring 71, whereupon the seal ring thus retains its structural strength and geometrical configuration over longer periods of time so that the O-ring thus does not significantly obstruct the flow of air through the valve assembly or the free shifting movement of the plunger.

The use of the steeply angled walls 76 and 77 is also significant in that it permits the magnitude of displacement of the seal ring 71, during shifting of the valve plunger, to be minimized. This reduction in the stroke of the valve plunger also minimizes the stroke of the operator, specifically the stroke of the operating solenoid which in turn greatly minimizes both the size and power requirements of the solenoid. For example, when utilizing valve seats 76 and 77 having a steep angle as noted above, the stroke of the valve plunger can be minimized so as to be in the order of 0.045 inch.

Providing the walls 76 and 77 with a concave configuration, as noted above, is also highly desirable since this concave configuration increases the clearance space around the seal ring 71, which clearance space permits the flow of air past the seal ring when the air flows from the inlet port 19 to one of the load ports 23 or 24. This increase in clearance space, as provided by the concavity of the walls 76 and 77, is believed to substantially minimize the turbulence of the air as it flows past the seal ring 71, while at the same time permits the spacing between the walls 76 and 77 to be minimized whereby a minimal stroke length is maintained.

In addition, the cylindrical enlargements 72 and 73 also assist in guiding or piloting the valve plunger during its shifting movement, since one of these portions is closely confined within either the opening 63 or 64 depending upon the position of the valve plunger.

To permit the various ports to communicate with one another in the desired manner, the liner 26 is provided with several sets of holes extending radially therethrough. The first set of holes 81 extend radially through the upper free end of liner section 26B so as to provide communication between the end opening 62 and the surrounding chamber 41. The set of holes 81 includes several identical holes spaced circumferentially around the liner. Similar sets of holes 82, 83, 84 and 86, respectively, communicate with the chambers 42, 43, 44 and 46 at one end thereof, with the holes respectively communicating with the openings 64, 66, 63 and 61 at the other ends thereof.

The valve plunger 54, in the illustrated embodiment, is normally urged upwardly by a conventional compression spring 87 which is disposed within the opening 59, which opening is in continuous communication with the lower chamber 46. The spring 87 thus normally retains the valve plunger in its uppermost position wherein the seal ring 71 sealingly engages the valve seat 77.

Referring now to the operator portion 13, there is provided a cup-shaped housing 91 having a cylindrical sidewall which sidewall is secured to one end of the valve housing 16. The housing 91 has a spool 92 therein on which is wound a solenoid coil 93. The solenoid coil causes activation of a solenoid plunger 94 which is slidably supported within the spool and is positioned in alignment with the valve plunger 54 so as to cause downward axial displacement thereof upon energization of the solenoid coil.

The structure of the operator portion 13 is explained in detail in copending application Ser. No. 543,822, filed Jan. 24, 1975, and entitled "Electrically Operated Mini-Valve". The disclosure of this copending application is thus incorporated by reference into this application.

OPERATION

While the operation of the foregoing valve assembly has been somewhat indicated throughout the above description, same will be reviewed in further detail to ensure a complete understanding thereof.

In the operation of the valve assembly 11, the port 19 functions as the inlet port and is connected to a conventional supply line through which a pressurized gas, such as air, is supplied to the valve assembly. The ports 23 and 24 each function as load ports and are individually connected to respective loads, such as pneumatic cylinders. The load ports 23 and 24 can each be connected to a separate cylinder or they may be connected to opposite ends of a double-acting cylinder. The remaining two ports 21 and 22 function as exhaust ports, and they may be connected to separate conduits for discharge of the air. If desired, the two exhaust ports 21 and 22 can be connected to a common exhaust conduit. However, by providing separate exhaust ports, each having a different restriction device associated therewith, the flow of air through the two exhaust ports can be controlled at different rates to thereby likewise provide for controlled movements of the cylinder piston or pistons. The ports 19, 23 and 24 are of conventional size so as to accommodate conventional conduits, such as conduits having an internal diameter of one-fourth inch.

The valve assembly is normally maintained in the position illustrated in FIG. 1, in which position the operator plunger 94 is in its uppermost position and the spring 87 maintains the valve plunger 54 in its uppermost position. The seal ring 71 is thus maintained in engagement with the valve seat 77 so that inlet port 19 is in open communication with load port 23. The seal ring 68 is in sealing engagement with the wall of opening 63 so that exhaust port 22 is isolated from the other ports. The other load port 24 is, however, in open communication with the upper exhaust port 21.

When shifting of the valve assembly is desired, when the operator portion 13 is electrically energized whereby the plunger 94 is moved downwardly into engagement with the valve plunger 54, whereby valve plunger 54 is likewise moved downwardly until the seal ring 71 is disposed in sealing engagement with the opposite valve seat 76. So long as the valve operator is maintained in its energized state, the seal ring 71 will be maintained against the valve seat 76 whereby load port 23 is isolated from the inlet port 19. This downward shifting of the plunger also causes the seal ring 68 to move out of engagement with the opening 63 so that the load port 23 is in communication with the lower exhaust port 22, whereas inlet port 19 communicates with the other load port 24. The seal ring 69 is also disposed in engagement with the wall defining the opening 64 so that exhaust port 21 is isolated from the load port 24.

The valve assembly 11 thus operates in a somewhat conventional manner even though the valve portion 12 is of very small size. For example, in a preferred embodiment of the invention, the cylindrical valve housing 16 has a diameter of approximately 1⅛ inches and the central opening 17 extending therethrough has a diameter of approximately one-quarter inch. The openings 63 and 64 defined by the liner 26 are approximately one-tenth of an inch, and the diameter of the reduced rod portions 67 are approximately 0.05 inch. As is readily apparent from these dimensions, it would be expected that normal manufacturing tolerances would be sufficient to interfere with proper valve operation, particularly with the sealed relationships. However, due to the manner in which the present invention is manufactured, namely by supporting the liner within the valve housing on a plurality of seal rings, and by manufacturing the liner with two identical opposed members so that the main resilient seal ring 71 coacts in the manner of a poppet valve, the desired sealed relationships can be provided within an extremely small valve assembly while still utilizing conventional manufacturing tolerances on the components of the valve.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A four-way valve assembly, comprising:
   a valve housing having a central opening extending therethrough, said housing also having a plurality of ports formed therein and extending radially outwardly from said central opening, said plurality of ports including an inlet port, a pair of load ports and at least one exhaust port;
   sleevelike liner means stationarily positioned within said central opening, said liner means having a plurality of elastomeric seal rings disposed in surrounding relationship thereto and spaced axially therealong, said seal rings being disposed in supporting and sealing engagement with the wall of said central opening;
   said liner means including first and second sleevelike liner members disposed in axial alignment with one another and positioned with their adjacent inner ends in abutting engagement, each of said liner members having an axially elongated center opening of a first diameter, at least one of said liner members having an enlarged opening means formed on the inner end therof, said enlarged opening means being defined at least in part by a wall which projects radially outwardly from said center opening, and the inner end of the other liner member also having a wall which projects radially outwardly from said center opening whereby said walls are disposed substantially opposite one another and define an enlarged annular space therebetween;
   said opposed walls as formed on the adjacent inner ends of said liner members being substantially conical and flaring outwardly from the respective center opening and extending in an axial direction toward the inner end of the respective liner member;
   elongated valve plunger means disposed within said liner means and supported for shiftable movement axially thereof, said valve plunger means having an elastomeric sealing ring mounted in surrounding relationship thereto and positioned within said enlarged annular space, said sealing ring having a maximum diameter which is greater than said first diameter whereby said annular sealing ring is positioned to abuttingly sealingly engage one or the other of said walls when said valve plunger means is shifted axially between its two extreme operational positions; and
   said liner means having opening means formed therein and extending radially therethrough for communicating directly with said enlarged annular space, said opening means also communicating at the radially outer end thereof with said inlet port.

2. A valve assembly according to claim 1, wherein the conical walls flare outwardly from said center opening and terminate substantially at the inner end of the respective liner member, each said conical wall having a curved concave configuration as it extends radially outwardly relative to the longitudinally extending axis of said valve plunger means.

3. A valve assembly according to claim 2, wherein the concave tapered walls, adjacent the radially inner edges thereof, extend radially outwardly at an angle of at least approximately 60° relative to the longitudinal axis of said plunger means.

4. A valve assembly according to claim 1, wherein each liner member has an enlarged opening formed therein adjacent the outer end thereof and disposed in coaxial alignment with said center opening, said enlarged opening being of larger diameter than said center opening, and said valve plunger means having a pair of flexible seal rings fixedly mounted in surrounding relationship thereto and disposed adjacent opposite ends thereof, each of said flexible seal rings being positioned adjacent the enlarged opening of one of said liner members and being movable into a position of sealed engagement with the respective liner member during shifting of said valve plunger means, said flexible seal rings being adapted to sealingly engage the walls defining said center openings.

5. A valve assembly according to claim 4, wherein said valve housing has two exhaust ports formed therein and projecting radially outwardly from said central opening, one of said exhaust ports communicating with the enlarged opening formed adjacent the outer end of one liner member and the other exhaust port communicating with the enlarged opening formed adjacent the outer end of the other liner member.

6. A valve assembly according to claim 4, wherein one of said load ports communicates with the center opening formed in one of said liner members and wherein the other load port communicates with the center opening formed in the other liner member.

7. A valve assembly according to claim 1, wherein said two liner members are identical and are disposed in directly opposed relationship so that the liners are symmetrical about a plane defined by the adjacent abutting inner ends.

8. A valve assembly according to claim 7, wherein each liner member has a center opening of a first diameter extending axially over a portion of the length thereof and the inner end of each liner member having an enlarged opening extending from said center opening to the inner end thereof, said enlarged opening being defined by a tapered concave wall, whereby the tapered walls as defined on the abutting ends of said liner members comprise said opposed walls and thus define said enlarged space therebetween, said tapered walls functioning as valve seats for said annular sealing member.

9. A valve assembly according to claim 8, wherein each liner member has a substantially cylindrical opening formed therein adjacent the outer end thereof in coaxial communication with said center opening, said cylindrical opening being of a diameter which is larger than said center opening, and said valve plunger means having a pair of elastomeric seal rings disposed in surrounding relationship thereto and positioned adjacent the opposite axial ends thereof so that each of said last-mentioned seal rings is adapted to sealingly engage the center opening of a respective liner member.

10. A valve assembly according to claim 9, wherein said valve housing includes two exhaust ports, one of said liner members including first opening means extending radially therethrough and communicating at the inner end thereof with said cylindrical opening and at the outer end thereof with one of said exhaust ports, said one liner member including second opening means extending radially therethrough and communicating at the inner end thereof with said center opening and at the outer end thereof with one of said load load ports, said second liner member including third opening means extending radially therethrough and communicating at the inner end thereof with said cylindrical opening and at the outer end thereof with said other exhaust port, said second liner member including fourth opening means extending radially therethrough and communicating at the inner end thereof with said center opening and at the outer end thereof with said second load port, and said liner means including fifth opening means extending radially therethrough adjacent the abutting ends of said liner members and communicating at the inner end thereof with said enlarged space and at the outer end thereof with said inlet port.

11. A valve assembly according to claim 9, wherein said liner means includes a third sleevelike liner member disposed in axial alignment and abutting engagement with the outer end of the second liner member, said third liner member having a central opening therethrough of substantially the same diameter as and aligned with the central openings in the first and second liner members, said third liner member having an annular portion which projects axially into the cylindrical opening of the second liner member and is spaced therefrom by a narrow annular groove which provides communication with one of said ports, and one of said seal rings as mounted on said valve plunger means being axially shiftable over the narrow annular groove so as to be positioned for sealing engagement with either the third liner member or the second liner member in response to axial shifting movement of the valve plunger means.

12. A valve assembly according to claim 1, wherein said valve plunger means comprises an elongated rodlike member having a diameter substantially less than the diameter of said opening means as formed in said liner means, said rodlike member having a substantially cylindrical enlargement formed thereon intermediate the ends thereof, said cylindrical enlargement including first and second cylindrical portions which have a diameter only slightly less than the diameter of said opening means, said first and second cylindrical portions being separated by an annular groove having said elastomeric sealing ring disposed therein.

13. A valve assembly according to claim 12, wherein said valve plunger means has second and third elastomeric sealing rings mounted thereon adjacent opposite ends thereof, said second and third elastomeric sealing rings being of substantially smaller diameter than said first-mentioned sealing ring said second and third elastomeric sealing rings being disposed for slidable sealing engagement with the walls defining said opening means.

14. A valve assembly according to claim 8, wherein the concave tapered walls, adjacent the radially inner edges thereof, extend radially outwardly at an angle of at least approximatey 60° relative to the longitudinal axis of said plunger means.

15. A valve assembly according to claim 1, wherein the conical walls flare outwardly from said center opening at an angle of at least approximately 60° relative to the longitudinal axis of said center opening.

16. A valve assembly according to claim 1, wherein said valve plunger means has second and third elastomeric sealing rings mounted thereon adjacent opposite ends thereof, said second and third elastomeric sealing rings being of substantially smaller external diameter than said first-mentioned sealing ring and being disposed axially on opposite sides of said first-mentioned sealing ring, said second and third elastomeric rings being disposed for slidable sealing engagement with the opening means defined in said first and second sleevelike liner members respectively, said second and third elastomeric sealing rings controlling flow of fluid to and from said load ports.

17. A shiftable valve assembly, comprising:
a valve housing having a central opening extending therethrough, said housing also having a plurality of ports formed therein and communicating with said central opening, said plurality of ports including an inlet port, a load port and an exhaust port;
sleevelike liner means stationarily positioned within said central opening, said liner means being disposed in supporting and sealing engagement with the wall of said central opening;
said liner means including first and second sleevelike liner members disposed in axial alignment with one another and positioned with their adjacent inner ends in abutting engagement, each of said liner members having an axially elongated center opening of a first diameter, at least one of said liner members having an enlarged opening means formed on the inner end thereof, said enlarged opening means being defined at least in part by a wall which projects radially outwardly from said center opening, and the inner end of the other liner member also having a wall which projects radially outwardly from said center opening whereby said walls are disposed substantially opposite one another and define an enlarged annular space therebetween;
said opposed walls as formed on the adjacent inner ends of said liner members being substantially conical and flaring outwardly from the respective center opening and extending in an axial direction toward the inner end of the respective liner member;
elongated valve plunger means disposed within said liner means and supported for shiftable movement axially thereof, said valve plunger means having elastomeric sealing ring means mounted in surrounding relationship thereto and positioned within said enlarged annular space, said sealing ring means having a maximum diameter which is greater than said first diameter whereby said sealing ring means is positioned to abuttingly sealingly engage one or the other of said walls when said valve plunger means is shifted axially between its two extreme operational positions; and
said liner means having opening means extending therethrough for providing communication between said enlarged annular space and one of said ports.

18. A valve assembly according to claim 17, wherein the conical walls flare outwardly from said center opening and terminate substantially at the inner end of the respective liner member, each said conical wall having a curved concave configuration as it extends radially outwardly relative to the longitudinally extending axis of said valve plunger means.

* * * * *